United States Patent [19]

Fleischer et al.

[11] Patent Number: 4,580,506
[45] Date of Patent: Apr. 8, 1986

[54] LIQUID FERTILIZER ATTACHMENT

[75] Inventors: Mathew W. Fleischer; John C. David, both of Columbus, Nebr.

[73] Assignee: Fleischer Manufacturing, Inc., Columbus, Nebr.

[21] Appl. No.: 624,380

[22] Filed: Jun. 25, 1984

[51] Int. Cl.⁴ .............................................. A01C 5/08
[52] U.S. Cl. ......................................... 111/7; 111/73;
            111/80; 172/430; 172/744; 172/748
[58] Field of Search ..................... 111/6, 7, 86, 73, 80,
            111/85; 172/430, 501, 661, 744, 748

[56] References Cited
U.S. PATENT DOCUMENTS

| | | | |
|---|---|---|---|
| 142,310 | 8/1873 | Wiard | 172/748 X |
| 1,050,993 | 1/1913 | Orr et al. | 172/748 X |
| 2,541,964 | 1/1951 | Hennings | 172/501 |
| 2,853,030 | 9/1958 | Dugan | 111/7 |
| 3,292,562 | 12/1966 | Clark | 111/7 |
| 3,469,637 | 9/1969 | Kennedy | 111/7 |
| 4,466,364 | 8/1984 | Hassenfritz | 111/7 |

FOREIGN PATENT DOCUMENTS

| | | | |
|---|---|---|---|
| 2117135 | 10/1971 | Fed. Rep. of Germany | 111/80 |
| 1194498 | 11/1959 | France | 172/744 |
| 917386 | 2/1963 | United Kingdom | 111/7 |
| 424529 | 10/1974 | U.S.S.R. | 111/7 |
| 657783 | 4/1979 | U.S.S.R. | 111/7 |

Primary Examiner—James R. Feyrer
Attorney, Agent, or Firm—Henderson & Sturm

[57] ABSTRACT

A fertilizer knife adapted to be attached to a planter. A housing is adjustably attached to the fertilizer knife and an adjustable mechanism is provided for permitting the knife to be adjusted vertically with respect to the housing, thereby adjusting the effective depth that the fertilizer, in a liquid form, will be released. The fertilizer knife is attached to the housing whereby the fertilizer knife will accurately track in front of the line into which the seeds are being planted, and this pivoting feature will also permit fertilizer knife to be deflected to one side or the other temporarily when rocks or other potentially damaging obstructions are encountered. The fertilizer knife has a leading edge extending from a point in close proximity to a vertical pivotal axis, and tapers downwardly and rearwardly therefrom.

6 Claims, 6 Drawing Figures

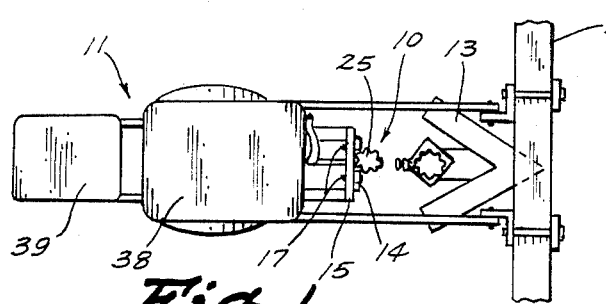
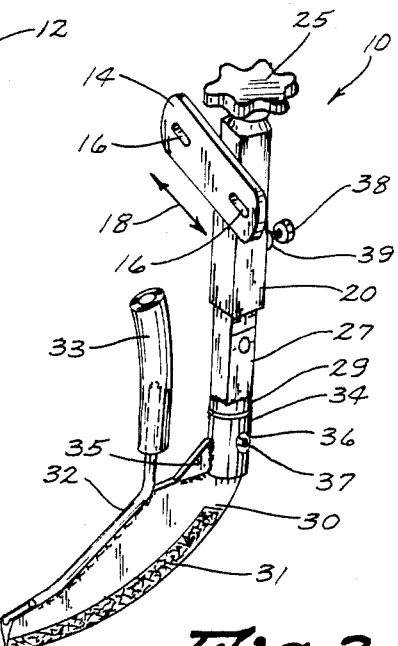
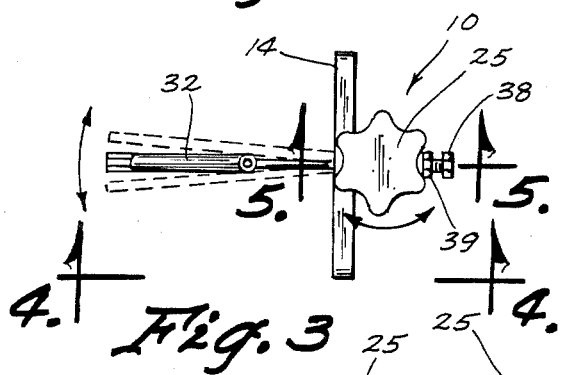
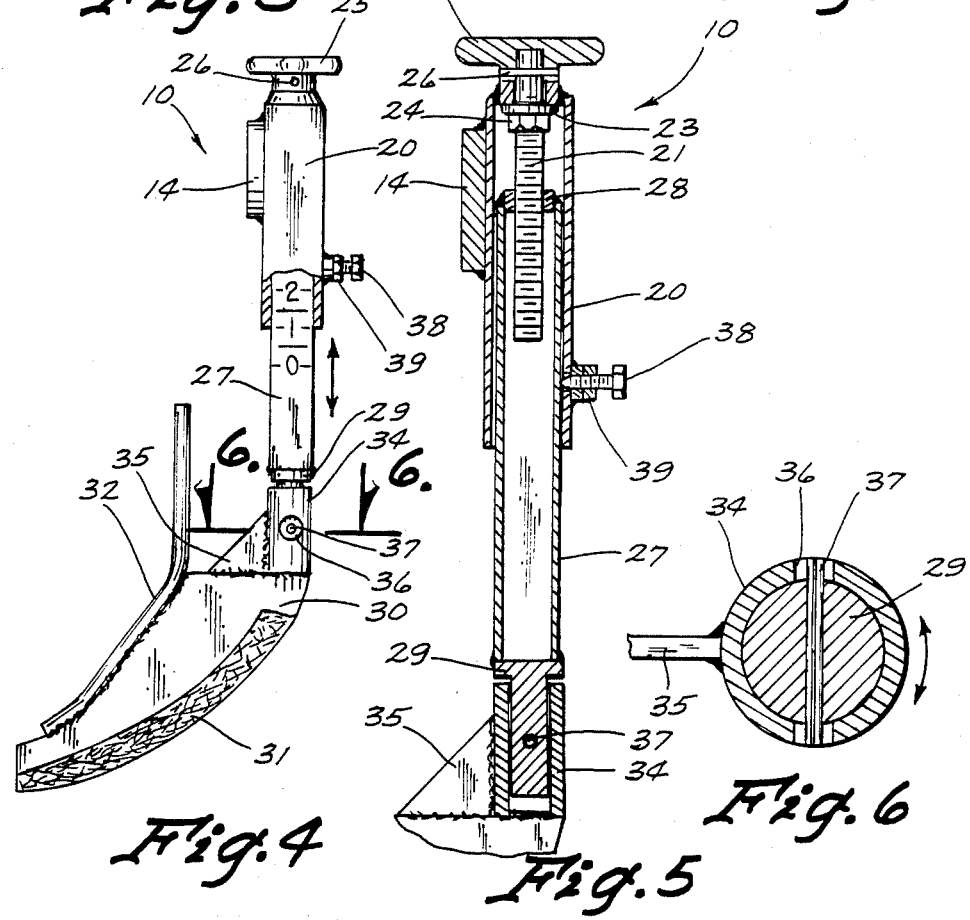

LIQUID FERTILIZER ATTACHMENT

TECHNICAL FIELD The present invention relates generally to fertilizer knives, and more particularly to a fertilizer knife for attachment to planters.

BACKGROUND ART

Fertilizer knives have been in use for many years and in recent years, with increasing popularity of minimum tillage types of planting systems, fertilizer knives have been attached to planters for the purpose of adding enough fertilizer adjacent to the seed to give the plant food for getting a good start. Ideally, the fertilizer should be placed about two inches to one side or two inches below the seed. If too much fertilizer is placed to near the seed bed, it will take water away from the seed or roots resulting in the well-known "fertilizer burn" phenomenon and poor germination.

In prior art systems typically, the fertilizer knife has a fixed depth and is fixed laterally as well. The problem with this fixed type of an arrangement is that placement of the starter fertilizer at the proper distance from the seed bed is not always achieved and may need adjustment. Also, when the rows are not precisely straight, then the fertilizer knife, if fixed, will tend to place the fertilizer too far to one side or the other when operatively attached to a rigid tool bar portion of the planter. Consequently, there is a need for a new fertilizer knife which has enough versatility to permit adjustment of the depth, to permit lateral adjustment, and to cause the knife to track more precisely at the set distance from the seed bed.

DISCLOSURE OF THE INVENTION

The present invention relates to a fertilizer knife apparatus adapted to be attached to a planter. A housing is adjustably attached to the fertilizer knife and an adjustable mechanism is provided for permitting the knife to be adjusted vertically with respect to the housing, thereby adjusting the effective depth that the fertilizer, in a liquid form, will be released. The fertilizer knife is attached to the housing whereby the fertilizer knife will accurately track in front of the line into which the seeds are being planted, and this pivoting feature will also permit the fertilizer knife to be deflected to one side or the other temporarily when rocks or other potentially damaging obstructions are encountered. The fertilizer knife has a leading edge extending from a point in close proximity to a vertical pivotal axis, and tapers downwardly and rearwardly therefrom.

An object of the present invention is to provide an improved fertilizer knife.

Another object of the present invention is to provide a fertilizer knife for attachment to planters which is more versatile than prior fertilizer knives.

A further object of the invention is to provide a fertilizer knife which is adjustable in depth, and laterally, and which will pivot to accurately track in front of the place where seeds are to be placed into the soil.

Other objects, advantages and novel features of the present invention will become apparent from the following detailed description of the invention when considered in conjunction with the accompanying drawings.

BRIEF DESCRIPTION OF THE DRAWINGS

FIG. 1 is a top plan view of the present invention shown attached to a planter;

FIG. 2 is a perspective view of the present invention when not attached to the planter;

FIG. 3 is a top plan view of a preferred embodiment of the invention as shown in FIG. 2 and showing in solid lines the position of the fertilizer knife when the rows are straight, and showing how the fertilizer knife can pivot to one side or the other in dashed lines when the rows are not straight;

FIG. 4 is a side elevational view taken along line 4—4 of FIG. 3;

FIG. 5 is a cross-sectional view taken along line 5—5 of FIG. 3; and

FIG. 6 is a cross-sectional view taken along line 6—6 of FIG. 4.

BEST MODE FOR CARRYING OUT THE INVENTION

Referring now to the drawings wherein like reference numerals designate identical or corresponding parts throughout the several views, FIG. 1 shows the present invention (10) connected to a planter (11) which is, in turn, attached to a tool bar (12) of a planter having a sweep (13) disposed just ahead of the fertilizer knife (10).

Fertilizer knife (10) is attached by a mounting plate (14) to a mounting bracket (15). The mounting plate (14) has a pair of slots (16) disposed therein which permit the fertilizer knife to be mounted to one side, laterally, or the other with respect to the mounting bracket (15) by merely shifting the position of the plate (14) with respect to the mounting bracket (15) and then tightening down bolts (17) in whatever adjusted position is desired. An arrow (18) shown in FIG. 2 illustrates how this mounting plate (14) can be moved to one side or the other.

A housing (20) is rigidly attached to the mounting plate (14), for example by welding. This housing (20) has a threaded shaft (21) rotatably attached therein by means of a bearing (22), washer (23) and threaded nut (24). The bearing (22) is rigidly attached to the top of the housing (20), and this permits a handle (25), rigidly attached to the top of threaded shaft (21) by means of a pin (26), to be rotated in one direction or the other.

A mating tube (27) is telescopically disposed within the housing (20), as can readily be seen in FIGS. 4 and 5. A threaded nut (28) is welded to the top of the telescoping tube (27) (FIG. 5) and the threaded shaft (21) is threadably engaged within the nut (28) whereby rotation of the handle (25) in one direction will cause the tube (27) to move upwardly and rotation of the handle (25) in an opposite direction will cause the tube (27) to move downwardly. The side of the tube (27) has a plurality of markings thereon, preferably in inches, whereby the distance moved upwardly or downwardly can readily be ascertained by looking at such markings on the side of the tube (27).

A post (29) is welded to the bottom of the tube (27) as can readily be seen in FIG. 5. The purpose of this post (29) is to permit attachment of a fertilizer shoe (30) thereto and to permit pivotal movement thereof as shown in FIG. 3. Fertilizer shoe (30) is of a "banana-type" configuration having a sharpened leading edge (31) and a rigid tube (32) attached to the following edge thereof. A source of liquid fertilizer is attached to the tube (32) by utilizing a flexible rubber or plastic tube (33) to be attached to the rigid tube (32), for example as shown in FIG. 2. The top portion of the fertilizer knife (30) has a cylinder (34) rigidly attached thereto and braced with a triangular member (35), which is welded solidly to the shoe (30) and also to the cylinder (34). A pair of enlarged openings (36) are disposed through the cylinder (34). A roll pin (37) is frictionally engaged through a hole in post (29) to remain in contact with the post (29) and has the ends extending outwardly therefrom and into the enlarged openings (36), whereby the shoe (30) can pivot to one side or the other to the extent shown in dashed lines in FIG. 3. The cooperation of the end of the roll pin (37) in contact with the edges of the opening (36) will prevent any more pivoting than that shown in dashed lines in FIG. 3.

In operation, the present invention would be utilized, for example as shown in FIG. 1, wherein the mounting plate (14) is bolted to the mounting bracket (15) on a planter (11) and is adjusted to be approximately two inches to one side or the other of the seed bed. This spacing can of course vary depending upon the desire of the user. Also, the particular depth can be adjusted by the rotation of the handle (25), and it may be chosen, for example, to have the outlet at the bottom of the tube (32) which is attached rearwardly on the rear edge of fertilizer shoe (30) to also be a couple of inches below the place where the seeds will be ultimately placed. Of course, the shoe (30) will have a source of liquid fertilizer attached thereto, for example by the flexible hose (33) shown in FIG. 2 which is attached to the rigid tube (32), whereby when the shoe (30) is slicing through the soil, fertilizer will be evenly dispensed through the bottom opening in the rigid tube (32).

A set screw (38), as shown in FIG. 5 for example, is threadably attached to the housing (20) by a threaded structure (39), whereby the vertical placement of the tube (27) with respect to the housing (20) may be locked in place by screwing the bolt (38) down tightly against the telescoping tube (27). Then, as the planter (11) is being utilized and when the rows are straight, the fertilizer knife (10) will track straight in front of the planting apparatus (11), but when the row is not straight, then the fertilizer knife will pivot to one side or the other, for example as shown in dashed lines in FIG. 3, so that it will precisely track in front of and maintain a proper set relationship with the place where the seeds will be planted.

Accordingly, it will be appreciated from the foregoing description that the present invention does indeed accomplish the objects set forth above. Obviously, many modifications and variations of the present invention are possible in light of the above teachings. It is therefore to be understood that, within the scope of the appended claims, the invention may be practiced otherwise than as specifically described.

We claim:

1. A fertilizer knife apparatus comprising:
   a planter;
   a housing attached to a front portion of said planter;
   a fertilizer knife for making a slot in the ground;
   adjustable means operably attached to said housing and to said fertilizer knife for permitting said knife to be adjusted vertically with respect to said housing;
   pivot means for operably attaching said fertilizer knife to said adjusting means for permitting said fertilizer knife to pivot about a substantially vertical axis, whereby the fertilizer knife will accurately track in front of a line into which seeds are to be planted, and which will tend to be deflected temporarily when rocks or other potentially damaging obstructions are encountered;
   said knife having a leading edge extending from a point in close proximity to said pivot means, downwardly and rearwardly therefrom, said knife also having an extreme rear edge thereof; and
   conduit means attached to said extreme rear end of said knife for delivering liquid fertilizer to said slot in the ground including means for attachment to a source of liquid fertilizer at the top thereof and leading to a discharge opening near the bottom thereof whereby the liquid fertilizer will be discharged into said slot formed in the ground by the knife without destroying the basic configuration of said slot in the ground.

2. The fertilizer knife apparatus of claim 1 wherein said leading edge of the fertilizer knife is arcuate in shape.

3. The fertilizer knife apparatus of claim 1 wherein said pivot means comprises a cylinder, having at least one slot in the side thereof, attached to the top of the knife, a post attached to the bottom of said adjustable means, said post extending into said cylinder, said post and said cylinder being formed about said substantially vertical axis, a pin rigidly attached to said post and extending into said slot in the cylinder whereby said cylinder can pivot about said substantially vertical axis between one position whereby the pin is against one side of the slot and another position whereby the pin is against the other side of the slot.

4. The fertilizer knife apparatus of claim 3 wherein said pin is a roll pin frictionally engaged into an opening in the post and extending into said one slot and into a second slot formed in the other side of the cylinder.

5. The fertilizer knife apparatus of claim 1 wherein said adjustable means includes a shaft rotatably attached to the top of the housing, said shaft being threaded on the lower end thereof and having a handle on the upper end thereof whereby manually rotating said handle causes like rotation of said threaded shaft, and a tubular member threadably attached to said threaded shaft at the top thereof and to said post at the bottom thereof whereby rotation of the handle in one direction will cause downward movement of the knife and rotation of the handle in an opposite direction will cause upward movement of the knife.

6. The fertilizer knife apparatus of claim 1 wherein a set screw is threadably attached to said housing and is operable to selectively engage said tubular member for selectively locking the position of the tubular member with respect to the housing.

* * * * *